(12) United States Patent
Ke et al.

(10) Patent No.: US 10,817,383 B2
(45) Date of Patent: Oct. 27, 2020

(54) METHOD, APPARATUS AND COMPUTER PROGRAM PRODUCT FOR MANAGING DATA BACKUP

(71) Applicant: EMC IP Holding Company LLC, Hopkinton, MA (US)

(72) Inventors: Li Ke, Chengdu (CN); Jie Li, Chengdu (CN); Tao He, Chengdu (CN); Jing Yu, Shanghai (CN); Yun Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 16/251,333

(22) Filed: Jan. 18, 2019

(65) Prior Publication Data

US 2019/0220366 A1    Jul. 18, 2019

(30) Foreign Application Priority Data

Jan. 18, 2018    (CN) .......................... 2018 1 0049494

(51) Int. Cl.
*G06F 11/14*    (2006.01)
*G06F 11/34*    (2006.01)

(52) U.S. Cl.
CPC ...... *G06F 11/1461* (2013.01); *G06F 11/1451* (2013.01); *G06F 11/1464* (2013.01); *G06F 11/1466* (2013.01); *G06F 11/3419* (2013.01)

(58) Field of Classification Search
CPC ............. G06F 11/1461; G06F 11/1451; G06F 11/1464; G06F 11/1466; G06F 11/3419;
(Continued)

(56) References Cited

U.S. PATENT DOCUMENTS 7,054,960 B1 *   5/2006   Bezbaruah .......... G06F 11/2071
                                                                710/33
9,684,564 B2 *   6/2017   Mam .................... G06F 3/0679
(Continued)

OTHER PUBLICATIONS

"Block Based Backup Technology", http://wiki.r1soft.com/display/TP/Block+Based+Backup+Technology, R1 Soft, dated Nov. 1, 2012. (4 pages).

(Continued)

*Primary Examiner* — Mano Padmanabhan
*Assistant Examiner* — Jean C Edouard
(74) *Attorney, Agent, or Firm* — Chamberlain, Hrdlicka, White, Williams, & Aughtry

(57) ABSTRACT

Embodiments of the present disclosure relate to a method, apparatus and computer program product for managing a data backup. The method comprises determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent. The method further comprises obtaining, based on an identifier of the source storage device, a first historical time elapsed for a previous addressing operation having the first data amount and a second historical time elapsed for a previous copy operation having the second data amount.

20 Claims, 6 Drawing Sheets

(58) Field of Classification Search
CPC ...... G06F 11/2071; G06F 11/14; G06F 11/34; G06F 3/06; G06F 3/0655; G06F 3/0619
USPC ........................................................ 711/162
See application file for complete search history.

(56) References Cited

U.S. PATENT DOCUMENTS

| | | | |
|---|---|---|---|
| 2015/0012496 A1* | 1/2015 | Minamiura | G06F 12/0804 707/654 |
| 2016/0004599 A1* | 1/2016 | Mam | G06F 3/0683 711/103 |
| 2016/0117226 A1* | 4/2016 | Hetrick | G06F 11/1451 711/162 |

OTHER PUBLICATIONS

Shimpi, A., https://www.anandtech.com/show/7173/samsung-ssd-840-evo-review-120gb-250gb-500gb-750gb-1tb-models-tested/8, dated Jul. 25, 2013. (7 pages).

* cited by examiner

METHOD, APPARATUS AND COMPUTER PROGRAM PRODUCT FOR MANAGING DATA BACKUP

FIELD

Embodiments of the present disclosure generally relate to a block-level data backup, and specifically to a method, apparatus and computer program product for managing a data backup.

BACKGROUND

In some cases of a backup, a large number of changed blocks are scattered over a storage device with very small granularity. Backing up changed blocks (also referred to as "an incremental backup") may consume more time than backing up the whole storage device (also referred to as "a full backup"). If the elapsed time of a backup is predictable, it is possible to switch to a full backup when an incremental backup consumes more time than the full backup. However, there still lacks an effective manner of predicting the elapsed time of a backup.

SUMMARY

Embodiments of the present disclosure provide a method, apparatus and computer program product for managing a data backup.

In a first aspect of the present disclosure, there is provided a method of managing a data backup. The method comprises determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent. The method further comprises obtaining, based on an identifier of the source storage device, a first historical time elapsed for a previous addressing operation having the first data amount and a second historical time elapsed for a previous copy operation having the second data amount. Furthermore, the method may also determine a predicted time required for backing up the extent based on the first historical time and the second historical time.

In a second aspect of the present disclosure, there is provided an electronic device. The electronic device comprises at least one processing unit and at least one memory coupled to the at least one processing unit and storing instructions executable by the at least one processing unit. The instructions, when executed by the at least one processing unit, cause the electronic device to perform acts comprising: determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent; obtaining, based on an identifier of the source storage device, a first historical time elapsed for a previous addressing operation having the first data amount and a second historical time elapsed for a previous copy operation having the second data amount; and determining a predicted time required for backing up the extent based on the first historical time and the second historical time.

In a third aspect of the present disclosure, there is provided a computer program product being tangibly stored on a non-transient computer readable medium and comprising machine executable instructions. The machine executable instructions, when executed, cause a machine to perform any steps of the method described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

Figure 1:
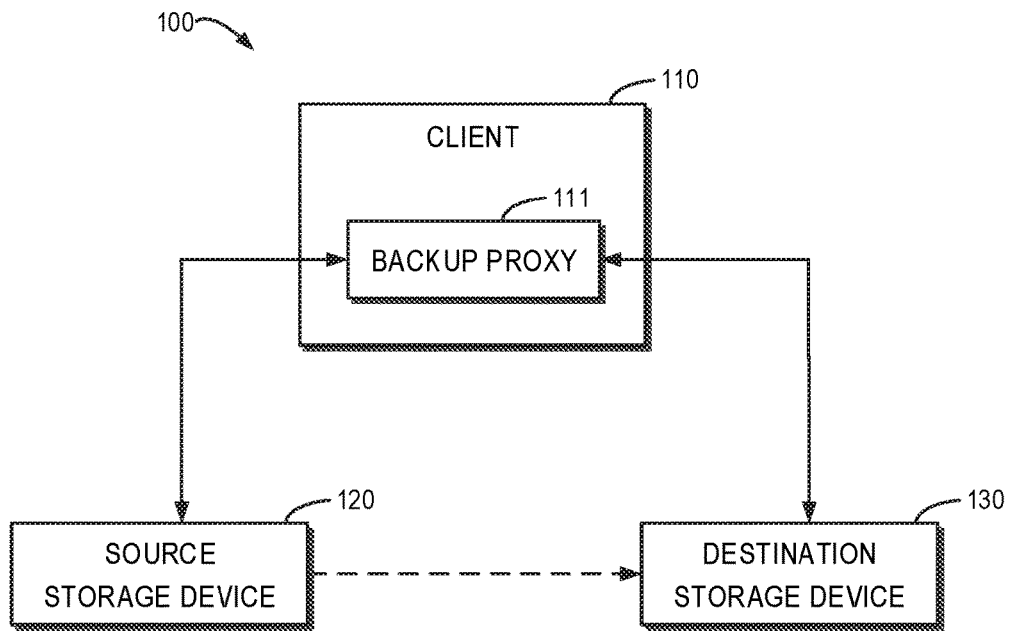
FIG. 1 illustrates a schematic diagram of an architecture for a data backup.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

The term "storage device" used herein may be physical or virtual (logical), such as a physical disk or a virtual network disk in a cloud environment, for example. The term "block" used herein refers to the smallest unit in which the storage device is divided. In different operating systems, the size of one block may be different. For instance, the size of one block may be 64 KB.

A block-level backup bypasses the file system and reads data directly from the storage device. Thus, a block-level backup is faster than a file-level backup and has become increasingly popular. In the present disclosure, for the sake of brevity, the term "backup" is used to represent the term "block-level backup." In addition, backing up may also be represented as recovering.

However, when changed blocks are scattered, the backup time becomes uncontrollable. In some cases of a backup, a large amount of changed blocks are scattered over a storage device with very small granularity. Reading these blocks is inefficient. As a result, backing up the changed blocks (also referred to as "an incremental backup") may consume more time than backing up the whole storage space (also referred to as "a full backup"). For example, a storage space of 10 G may have changed blocks with a total amount of 1 G. Because the 1 G changed blocks are not continuous but are a set of many scattered small blocks, backing up the 1 G of changed blocks may consume more time than backing up the 10 G storage space, which makes it difficult to achieve a backup in a limited backup window.

In the present disclosure, there is developed an adaptive prediction method based on a time series model. The tradeoff between prediction accuracy and algorithm complexity is fully considered. The prediction parameters are refined by continuous learning, which adapts to changes of the I/O (input/output) performance of the storage device and different running environments. With the prediction method of the present disclosure, an inefficient incremental backup may be avoided by switching to an equivalent full backup, which is less time-consuming.

FIG. 1 illustrates a schematic diagram of an architecture 100 for a data backup. It is to be understood that the structure and function of the architecture 100 are described only for illustrative purpose instead of implying any limit to the scope of the present disclosure. Embodiments of the present disclosure can be embodied in different structures and/or functions.

As shown in FIG. 1, the architecture 100 may include a client 110, a source storage device 120 and a destination storage device 130. The source storage device 120 and/or destination storage device 130 may be local or mounted locally. A backup proxy 111 runs on the client 110 and is operable to back up data stored on the source storage device 120 to the destination storage device 130. The backup proxy 111 may run in a physical machine or virtual machine. For instance, the backup proxy 111 may be a proxy plugin. The methods described below may be performed by the backup proxy 111 running on the client 110.

Figure 2:
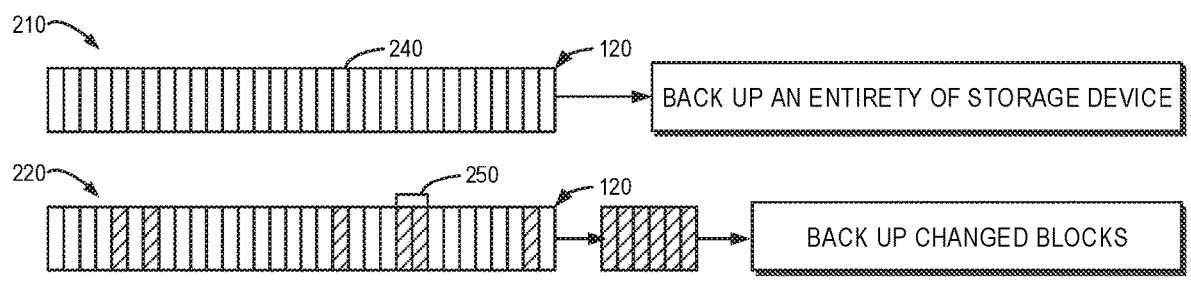
FIG. 2 illustrates two types of backups.

FIG. 2 illustrates two types of backups, in which a block 240 that forms the source storage device 120 is shown. For example, the source storage device 120 is a disk. An extent 250 shown in FIG. 2 includes continuous blocks 240 that changed. Typically, there exist two kinds of backups: a full backup 210 and an incremental backup 220. The incremental backup 220 refers to a backup in which successive copies of the blocks only contain a part of blocks that has changed, because unchanged blocks have been backed up in a preceding backup copy that has been done. As shown in FIG. 2, for the full backup 210, all the blocks 240 of the source storage device are backed up. However, for the incremental backup 220, only the changed blocks are backed up.

Only by way of example, in the case of the incremental backup 220, the client 110 receives a list of extents 250 describing how the changed blocks are organized. As used herein, the term "extent" may be a physically linear series of blocks that may be read one after another so as to minimize the disk head movement. The extent 250 may be represented by two parameters: an offset from address 0 indicating a starting address and a length, where the length is equal to an integer multiple of a block. That is, an extent may be represented as [offset, length]. A typical list of extents is as follows:

[offset1, length1], [offset2, length2], [offset3, length3] . . .

For a first extent in the extent list, the backup proxy 111 reads data from the address "offset1" on the source storage device 120 (the number of read bytes is length 1), and then appends the read data to a target file stored on the destination storage device 130. In the same way, the backup proxy 111 continues to copy and append the next extent until it finishes all the extents in the list. In an example, the extents in the list are sorted by their starting addresses to minimize the disk head movement.

In the backup proxy 111, compared with other parts of processing in a backup, processing for reading and copying blocks are highly time-consuming parts. For example, the other parts of processing may include: creating an environment during the preparation process of a backup, for instance, cloning and mounting the source storage device 120 to be backed up to the backup proxy 111; and cleaning the spot at the end of a backup, for instance, demounting and deleting the clone. Additionally, the elapsed time of reading and copying blocks may be raised with the increasing of the changed blocks to be backed up. Even if the same number of blocks are read and copied for multiple backups, the elapsed time may vary, because the blocks to be backed up may be continuous or scattered over the storage device. This means that the I/O costs of the storage device are different. There are a lot of factors impacting on the elapsed time of reading and copying, such as the type of the storage device, the size of the storage device, the operating system environment and so on. On the other hand, for the operating time of backups, apart from the operating time of the processes for reading and copying blocks which varies considerably, the operating time of other processes (such as the preparation process at the start of the backup and the cleaning process at the end of the backup) among backups is generally close to a constant. For the above mentioned reasons, the elapsed time of a backup in the present disclosure may refer to the elapsed time for reading and copying blocks in the backup proxy 111.

In some cases, the number of extents for an incremental backup may be extremely large. This leads the execution of this backup is extremely time-consuming, which may be even more time-consuming than a full backup for the same backup source. This is because the efficiency of reading scattered blocks is lower than that of reading continuous disk on HDD (hard disk drive) or SSD (solid state drive). If the elapsed time of a backup is predictable, it may be possible to switch to a full backup when an incremental backup consumes more time than the full backup.

However, there is not an effective way to predict the elapsed time of a backup. Learning and prediction usually involve time-consuming algorithms. A backup service is quite time-sensitive. A time-consuming algorithm loses its value essentially in the backup context, even if the prediction may be accurate. In addition, the combinations of factors which may impact on the elapsed time are very complicated and volatile. All these make prediction difficult. Embodiments of the present disclosure provide an adaptive prediction method for improving the performance of a block-level backup.

Figure 3:
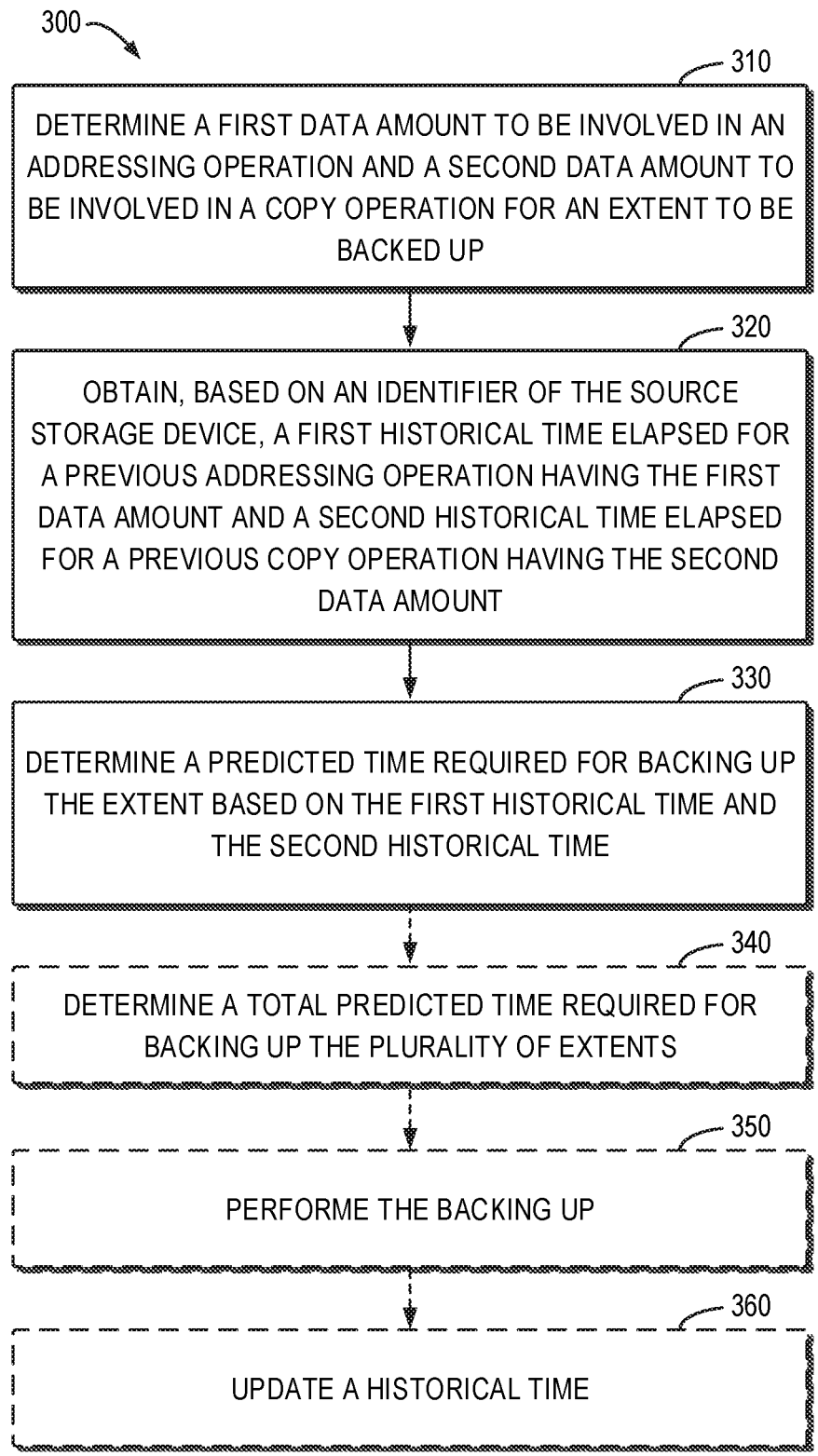
FIG. 3 illustrates a flowchart of a method of managing a data backup in accordance with an embodiment of the present disclosure.

FIG. 3 illustrates a flowchart of a method 300 for managing a data backup in accordance with an embodiment of the present disclosure. For example, the method 300 can be implemented by the backup proxy 111 shown in FIG. 1. It is to be understood that the method 300 may further include additional blocks not shown and/or omit some blocks as shown. The scope of the present disclosure is not limited in this regard. All the dashed blocks in FIG. 3 are optional.

At 310, the backup proxy 111 determines an extent to be backed up on the source storage device 120 and determines a first data amount to be involved in an addressing operation and a second data amount to be involved in a copy operation for the extent. In some embodiments, before performing block reading, the backup proxy 111 may capture the extents 250 with changed data on the source storage device 120.

As stated above, a full backup performs continuous reading and writing on a storage device while an incremental backup performs a series of reading-appending iterations. The backup operation of each extent may be considered as one iteration. The time series model of the present disclosure is built on an extent. Within each iteration, two types of operations are involved: the addressing (DA) operation and the copy (RAD) operation. DA is a first operation within a reading-appending iteration for addressing the position indicated by the "offset" field of the extent. Offset indicates the starting address of the extent. RAD is a succeeding operation of DA for continuously copying (reading-appending) an amount of data indicated by the "length" field of the extent. At the microscopic level, a full backup may be considered as a special case of an incremental backup where only one iteration is performed. For example, the data amount may take byte or bit as a unit.

Figure 4:
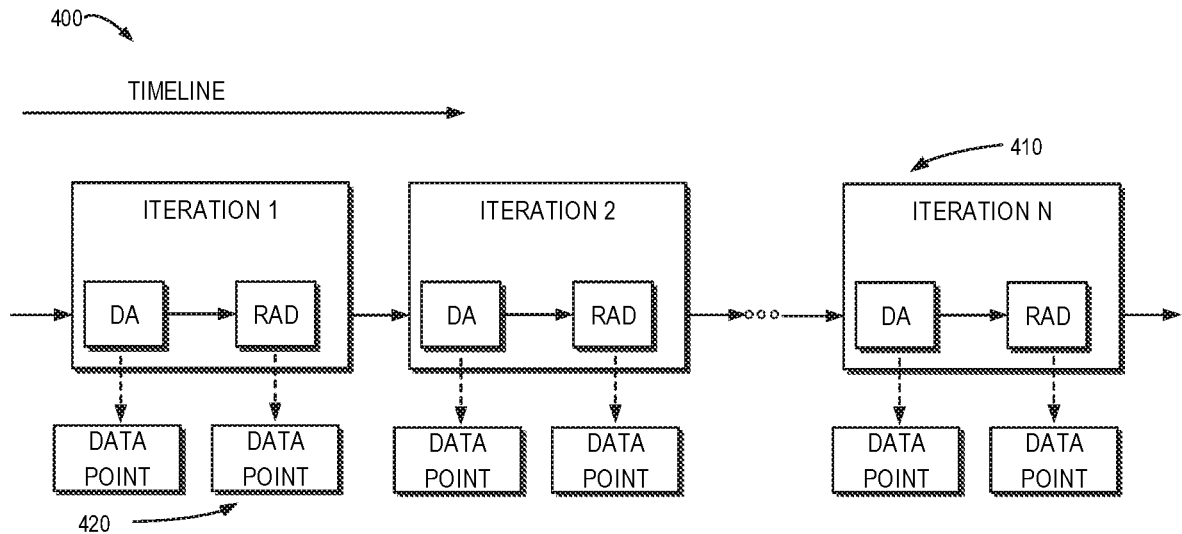
FIG. 4 illustrates a schematic diagram of a backup process for a plurality of extents in accordance with an embodiment of the present disclosure.

FIG. 4 illustrates a schematic diagram of a backup process 400 for a plurality of extents in accordance with an embodiment of the present disclosure. The iteration for each extent may be performed successively over time. Only by way of example, FIG. 4 only illustrates three iterations 410: iteration 1 for a first extent, iteration 2 for a second extent, and iteration N for the $N^{th}$ extent. These iterations may belong to the same backup/recovery process. As stated above, each iteration 410 includes the addressing (DA) operation and the copy (RAD) operation. In the present disclosure, DA or RAD may also be referred to as a data point 420.

The data point 420 is a combined time metric of a DA or RAD operation. The data point 420 contains a tuple of values: {workload, cost}, where value workload is a metric of data amount for a DA or RAD operation, for instance, assuming that a RAD operation reads 65536 bytes, then the workload of this operation is 65536; value cost is a time metric for a DA or RAD operation, for example, assuming that a DA operation costs 100 us, then the cost of the operation is 100, namely, the cost of an operation represents the elapsed time of the operation.

For the same backup source (the source storage device 120) and the same type of operations (DA or RAD), the cost of an operation is closely related to its workload. In other words, the time elapsed for the operation is closely related to its data amount involved. Therefore, the prediction of the elapsed time of an operation is able to be made according to the elapsed time (cost) of completed operations with the same data amount (workload). Then, the elapsed time of a backup is a sum of the elapsed time of all the operations belonging to the backup. Therefore, if the elapsed time of all the operations belonging to the backup is predicted, the prediction for the elapsed time of the backup is able to be made. One of the inventive concept of the present disclosure is a prediction based on detectable time series data.

At 320 of FIG. 3, based on an identifier of the source storage device, the backup proxy 111 obtains a first historical time elapsed for a previous addressing operation having the first data amount and a second historical time elapsed for a previous copy operation having the second data amount. The first and second historical time are also referred to herein as prediction parameters. For different backup sources (different source storage devices 120), the prediction parameters may be different due to differences in type, size, operating environment and so on of the storage devices. The prediction parameters may be stored in association with the identifier (ID) of the source storage device 120. In some embodiments, a group of prediction parameters for a backup source is stored as a key-value pair, where the "key" is ID of a backup source, and the "value" is a JSON character string containing all the prediction parameters associated with the backup source.

The backup proxy 111 may load the current prediction parameters and look up the first and second historical time in the prediction parameters. As stated above, the current prediction parameters are packed into a JSON character string stored in a key-value pair. The JSON character string is fetched by the backup source ID as the key. Then, the backup proxy 111 may unpack the JSON character string into two lists of previous data points 420. One list contains prediction parameters of an addressing (DA) operation (also referred to as PP_DA) and the other list contains prediction parameters of a copy (RAD) operation (also referred to as PP_RAD). Specifically, the two lists include information on the data amount and elapsed time of the previous addressing operation and previous copy operation. The backup proxy 111 may search the respective list for the historically elapsed time of previous operations having the same data amount according to the type of the current operation. As an example, the backup proxy 111 may find the first historical time elapsed for a previous addressing operation having the first data amount in the PP_DA list and find the second historical time elapsed for an previous copy operation having the second data amount in the PP_RAD list.

At 330 of FIG. 3, the backup proxy 111 determines a predicted time required for backing up the extent based on the first historical time and the second historical time. A sum of the first and second historical time may be considered as time to be taken for backing up the extent. In this way, the present disclosure proposes a time-metric-based model (the time series model). This model describes the backup time consumed at the microscopic level of extents 250. By dividing the time for an extent backup into two parts for consideration, the time for prediction may be shortened and meanwhile, accuracy of prediction may be guaranteed.

At optional 340, there may be a plurality of extents to be backed up that are non-continuous to each other. The plurality of extents may belong to the incremental backup described above. Based on the predicted time required for backing up the extent, the backup proxy 111 may determine a total predicted time required for backing up the plurality of extents. The total predicted time may be a sum of the elapsed time of addressing operations and copy operations of the plurality of extents. Data on the source storage device may be backed up based on the total predicted time.

In some embodiments, as will be discussed in greater detail in the following backup execution stage, the plurality of extents 250 may be converted into two lists of data points, one list being a predicted list P_DA used for the addressing operation and the other list being a predicted list P_RAD for the copy operation. These two predicted lists may be initiated as empty. The first data amount and the second data amount are filled into the workload of the data points. The two predicted lists may be sorted in the ascending order of the workload. Historical data points with the same data amount "workload" are looked up in the above prediction parameter lists (PP_DA and PP_RAD) and the corresponding historically elapsed time "cost" are filled into the predicted lists P_DA and P_RAD. The prediction parameter lists PP_DA and PP_RAD may also be sorted in the ascending order of the workload. Therefore, the predicted lists and the prediction parameter lists may be accessed using the same pointer. With matched data amount (workloads), the historically elapsed time "costs" may be fetched from the PP_DA and PP_RAD and the fetched costs may be filled into the P_DA and P_RAD. It shall be appreciated that the time complexity of this prediction stage is O(N) and the space complexity is O(N), where N is the number of data points. Then, the total predicted time required for backing up the plurality of extents may be calculated based on the historically elapsed time "cost" filled in the predicted lists P_DA and P_RAD. The total predicted time represents the predicted elapsed time of the backup. A backup strategy may be selected based on the total predicted time.

Figure 5:
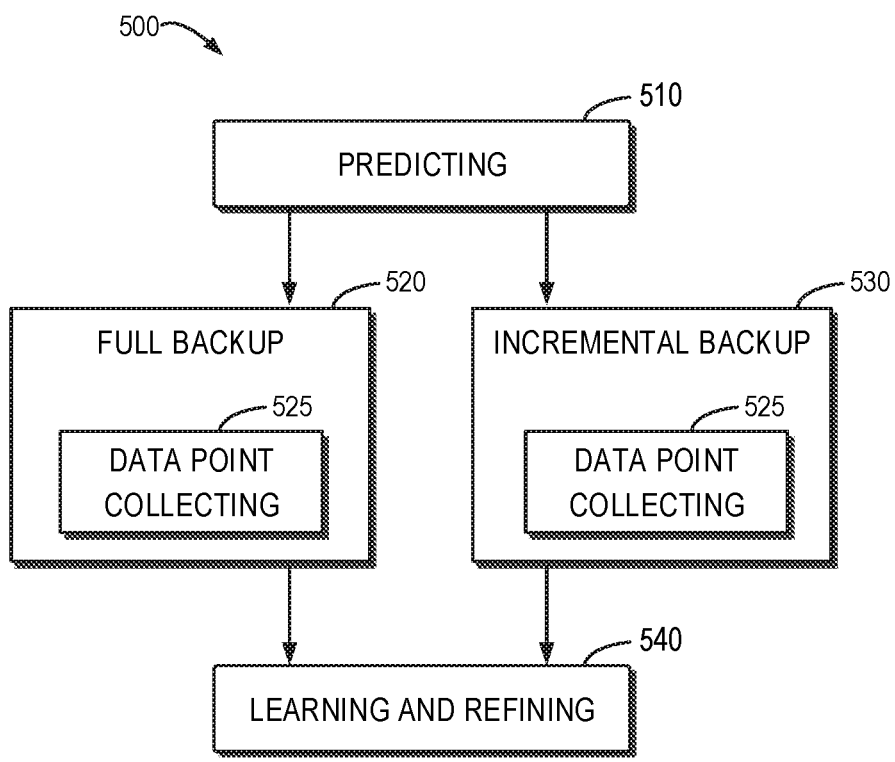
FIG. 5 illustrates a schematic diagram of a backup process in accordance with an embodiment of the present disclosure.

FIG. 5 illustrates a schematic diagram of a backup process 500 in accordance with an embodiment of the present disclosure. The backup process 500 mainly includes three phases: a predicting phase 510, a backup performing phase (including a full backup performing phase 520 and an incremental backup performing phase 530) and a learning and refining phase 540. In the predicting phase 510, the backup proxy 111 may predict the execution time required by an incoming backup based on the extent 250 of the backup and the previously learned prediction parameters. The predicting phase 510 happens before the backup performing procedure.

The predicted result of the predicting phase 510 may be used to select the backup strategy. In particular, the backup proxy 111 may determine the total predicted time required for backing up a plurality of extents 250. Then, the backup proxy 111 may compare this total predicted time with the time required for backing up an entirety of the source storage device 120 (namely, a full backup). As is known, the first backup (also referred to as the 0-level backup) is a full backup. The elapsed time of the full backup may be learned and saved as prediction parameters for the following backups during the 0-level backup. Thus, it is able to compare the total predicted time of the incoming incremental backup with the elapsed time of the past full backup. If the full backup consumes less time, then it is possible to switch to the procedure of the full backup by returning a flag of the backup strategy. In this way, the backup procedure may be optimized based on a prediction. If the prediction indicates that the block reading of an incremental backup is less efficient than continuous disk reading of a full backup, the backup procedure may be optimized by switching to the full backup. The full backup is equivalent to the incremental backup because there is no loss of blocks. Additionally, with the help of data deduplication feature of the backend storage device, no additional storage space will be consumed.

Specifically, in response to the total predicted time being less than a time required for backing up an entirety of the source storage device, the backing up for the plurality of extents may be performed, respectively, namely, entering the incremental backup performing phase 530. In the incremental backup performing phase 530, blocks of the plurality of extents that are scattered are read. In response to the total predicted time being more than the time required for backing up an entirety of the source storage device, the backing up for an entirety of the source storage device is performed, namely, entering the full backup performing phase 520. In the full backup performing phase 520, successive reading is performed until all the blocks of the source storage device 120 are read. In other words, if the predicted result indicates that the incremental backup costs more time than the full backup, then it will be switched to the full backup. Data point collecting 525 is implemented no matter whether in the full backup performing phase 520 or in the incremental backup performing phase 530. In the data point collecting 525, a data point for each operation is collected during the blocks reading and copying. That is, the data point collecting 525 happens during the backup performing procedure.

In the learning and refining phase 540, the data points collected in the data point collecting 525 are learned, and then the current prediction parameters are generated or refined based on the learning result. Each time the same source storage device 120 is backed up, data points are collected and prediction parameters are refined, which makes the prediction more accurate. As the prediction parameters are learned and refined continuously, the prediction method in the present disclosure has the adaptability to block-level backups in various environments. In addition, the configuration for different destination environments is not required.

Returning to FIG. 3, at optional 350, the backup proxy 111 may execute the backing up for the extent 250. As stated above, inside an iteration for the extent 250, the blocks indicated by the extent 250 are read and appended. In some embodiments, the reading operation on the source storage device 120 is treated as a file reading operation. Within an iteration, the backup proxy 111 may implement an addressing operation and a copy operation. In the addressing operation, the backup proxy 111 may address to the starting address of the extent and read the first data amount to a buffer. As an example, the backup proxy 111 may adjust the reading and writing position to the block indicated by the offset of the extent 250 by means of an operating system call (such as lseek). The calling of lseek will not lead to a disk I/O, while the first reading operation (reading of the first data amount) includes the process of disk addressing. In the copy operation, the backup proxy 111 may append the read first data amount from the buffer to a stream store, and continue to read and append the rest of data amount of the extent 250 until all of a data amount indicated by the length of the extent 250 is finished. The second data amount is equal to the data amount indicated by the length of the extent 250.

At optional 360, the backup proxy 111 may update, based on data points collected during the backup performing procedure, a historical time for use by a subsequent backup. In some embodiments, the backup proxy 111 may determine a first actual time elapsed for performing the addressing operation. The backup proxy 111 may update, based at least in part on the first actual time, the first historical time for a subsequent backup to use. In some embodiments, the backup proxy 111 may determine a second actual time elapsed for performing the copy operation. The backup proxy 111 may update, based at least in part on the second actual time, the second historical time for a subsequent backup to use. In this way, the learning of actual data may be realized for refining prediction parameters.

In some embodiments, the actual time elapsed for the addressing operation or the copy operation may be collected by time collectors placed before or after these operations. At the start of the addressing operation, a time collector records a first timestamp (for instance, in microseconds). At the end of the addressing operation or the start of the copy operation, a (further) time collector records a second timestamp (for example, in microseconds). Then, the first actual time elapsed for performing the addressing operation may be determined by calculating a difference between the first and second timestamps. At the end of the copy operation, a (further) time collector records a third timestamp (for instance, in microseconds). Then, the second actual time elapsed for performing the copy operation may be determined by calculating a difference between the second and third timestamps.

Figure 6:
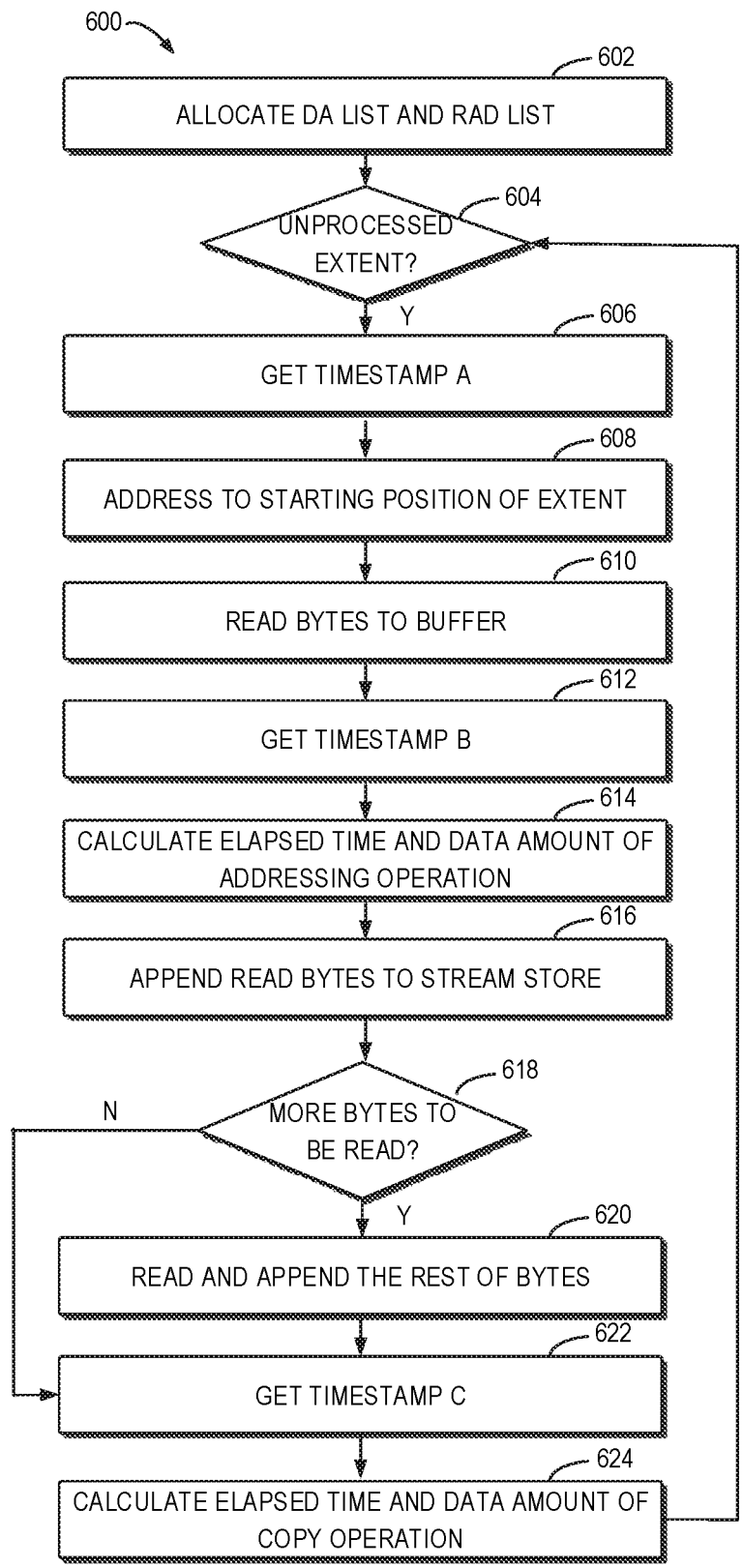
FIG. 6 illustrates a flowchart of a method of collecting data points during backup performing in accordance with an embodiment of the present disclosure.

FIG. 6 illustrates a flowchart of a method 600 of collecting data points during backup performing in accordance with an embodiment of the present disclosure. For example, the method 600 can be implemented by the backup proxy 111 shown in FIG. 1. It is to be understood that the method 600 may further include additional blocks not shown and/or omit some blocks as shown. The scope of the present disclosure is not limited in this regard.

At 602, taking execution performance into account, the backup proxy 111 may pre-allocate two lists for the addressing (DA) operation and the copy (RAD) operation, respectively. Each list may have a certain number of data points. As stated above, the number of the data points should equal to the number of extents to be backed up. Thus, by avoiding memory allocation within the iterations, it is quite fast to fill data points.

At 604, the backup proxy 111 may determine whether there is any unprocessed extent. If no, the backup ends. If yes, at 606, a time collector A placed before the addressing (DA) operation may get a timestamp A.

At 608, lseek to the starting position of the extent (the starting address indicated by the offset). At 610, bytes are read to the buffer. The number of read bytes may depend on the system configuration and the extent length. Assuming that a system is configured to read at most 16 blocks during addressing while the length is greater than 16 blocks, then 16 blocks are read at 610. Assuming that a system is configured to read at most 16 blocks during addressing while the length is smaller than 16 blocks, then blocks included in the length are read at 610. At 612, a time collector B placed after the addressing (DA) operation may get a timestamp B. At 614, the elapsed time (cost) and data amount (workload) of the addressing (DA) operation may be calculated to record a data point of the DA operation. The workload of an operation can be collected by the same time collector. Different from the cost, the workload is not a time value but represents how much workload (data amount) is involved in the operation. The workload (also referred to as the first data amount) of the DA operation is the number of bytes read at 610.

At 616, the bytes read in 610 are appended from the buffer to the stream store. At 618, the backup proxy 111 may determine if there are more bytes to be read. If yes, at 620, the rest of bytes are read and appended. If there is no bytes that have not been read, at 622, a time collector C placed after the copy (RAD) operation may get a timestamp C. At 624, the elapsed time (cost) and data amount (workload) of the RAD operation may be calculated to record a data point of the RAD operation. The workload (also referred to the second data amount) of the RAD operation is the number of appended bytes, namely, equal to the length of the extent. The method 600 may return to 604 and determine again if there is any unprocessed extent so as to process the remaining extents.

In the above manner, during block reading and appending, data points are collected and filled into two lists pre-allocated at 602. As stated above, one list is used for data points of DA operations, also referred to as actual/observational values of DA operations (OV_DA), and the other list is used for data points of RAD operations, also referred to as actual/observational values of RAD operations (OV_RAD).

Figure 7:
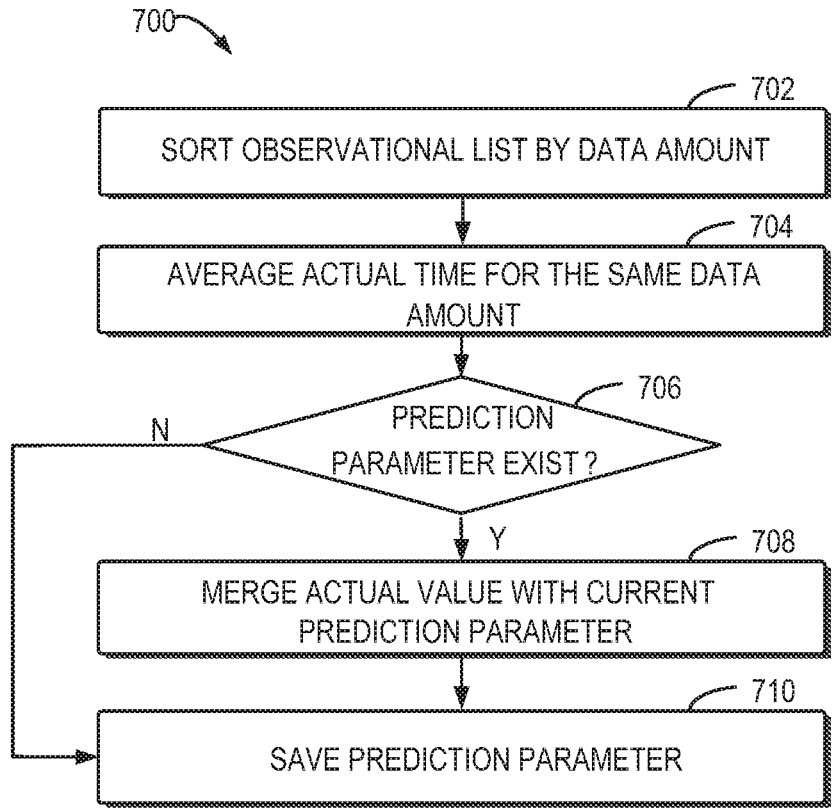
FIG. 7 illustrates a flowchart of a learning and refining method of updating a historical time in accordance with an embodiment of the present disclosure.

FIG. 7 illustrates a flowchart of a learning and refining method 700 of updating a historical time in accordance with an embodiment of the present disclosure. For example, the method 700 can be implemented by the backup proxy 111 shown in FIG. 1. It is to be understood that the method 700 may further include additional blocks not shown and/or omit a shown block. The scope of the present disclosure is not limited in this regard. The learning and refining method 700 may be implemented as data processing based on a list of data points. From this perspective, both the learning input data and the refined results as prediction parameters may be represented as a list of data points. Alternatively or additionally, the predicting phase 510 and the learning and refining phase 540 may share the same list of data points, which gives fast execution by avoiding memory copying.

At 702, data points in the two lists (OV_DA and OV_RAD) collected with the method 600 may be sorted by the size of the data amount "workload". As an example, the data points may be sorted in the ascending order of workload. This is a pre-processing act. Thereafter, this order may be kept.

At 704, for each of the OV_DA and OV_RAD lists, the average elapsed time (cost) of data points having the same data amount (workload) is calculated. This is a learning act. Since several extents having the same length may exist within a backup, several actual time values (costs) may exist for the same data amount (workload). The arithmetic mean of these costs is calculated and data points having the same workload are merged. For example, the input OV_DA list is [{100, 20}, {100, 30}, {300, 50}] and the averaged output OV_DA list is [{100, 25}, {300, 50}]. That is, the output OV_DA list does not contain repetitive workload (data amount). It is easy to see that with the increasing of actual values and the increasing of extents to be predicted, the arithmetic mean of actual elapsed time will be close to the real elapsed time for a subsequent backup. It is to be understood that the deduplicated actual observational lists (OV_DA and OV_RAD) may also be referred to as newly learned prediction parameters.

At 706, the current (existing) prediction parameters are loaded and it is determined whether there exist prediction parameters. This loading may performed almost the same procedure as the loading of prediction parameters in the predicting phase 510. To save time, a mechanism for avoiding double loading procedure of the same backup source ID in these two phases may be used. The loaded prediction parameters may be unpacked into two lists of data points: one list is the PP_DA list for the addressing operation and the other list is the PP_RAD list for the copy operation. It is to be understood that the prediction parameters include data amount of a historical operation and the associated historical time.

At 708, in response to the existence of prediction parameters, the actual values are merged with the current prediction parameters, which is a refining act. The OV_DA list is merged into the PP_DA list, and the OV_RAD list is merged into the PP_RAD list. Within the merged lists, the arithmetic mean of the costs (elapsed time) is calculated again and data points having the same workload (data amount) are folded. For example, the OV_DA list is [{100, 25}, {300, 50}] and the PP_DA list is [{200, 35}, {300, 60}], and then the merged list is [{100, 25}, {200, 35}, {300, 55}]. The ascending order of the workload (data amount) may still be kept. In this way, historical time in the prediction parameters is updated. The refining act enhances the prediction range in the workload (data amount) level and is adaptive to changes of actual values.

Therefore, the overall effect of 704 and 708 is as follows. In some embodiments, the backup proxy 111 may determine a first average time of the first historical time (prediction parameter) and at least one reference time, and update the first historical time based on the first average time. This reference time is a time (also referred to as an actual value/observational value) elapsed for a reference addressing operation having the first data amount. For example, the reference time may be the time observed actually in the method 600. In some embodiments, the backup proxy 111 may determine a second average time of the second historical time and at least one reference time, and update the second historical time based on the second average time. This reference time is a time elapsed for a reference copy operation having the second data amount. In this way, the historical time may be made more approximate to the actual time, thereby improving accuracy of prediction.

At 710, the refined prediction parameters are saved, which is a reverse processing of loading of 706. For example, the prediction parameters as a list of data points are packed into a JSON character string and stored in association with the identifier of the source storage device 120. When prediction parameters do not exist at 706, the actual observational lists (OV_DA and OV_RAD) may be saved at 710 as prediction parameters for use by a subsequent prediction.

In some embodiments, during the calculation and merging, a pointer may be used to access elements in the list. It is easily understood that the time complexity of the method 700 (apart from 702) is O(N) and the space complexity is O(N), where N is the number of data points. It is further easily understood that the prediction parameters are statistic data points. With the increasing of backups executed on the source storage device 120, the statistic historically elapsed time will be refined and approximate the actual elapsed time.

Through the above method of collecting and learning the time metrics of a backup, a self-adaptive prediction may be realized. The prediction parameters may be generated by the learning results and can be refined continuously. By storing prediction parameters in association with the identifier of the source storage device 120, it may be adaptive to changes of disk I/O performance and different environments.

Table 1 below shows the test results. In a test process, a backup source is created firstly and then changed blocks are written into the backup source via a writing-data tool (such as DD). In the writing process, the offset and the length of changed blocks are generated in random via test scripts. Then a backup is performed and logs are collected. In the logs, the following metrics are recorded: execution time of the predicting phase (PT), execution time of the learning and refining phase (LRT), predicted elapsed time of a backup (PET) and actual elapsed time of the backup (RET). The same backup source is tested many times, respectively. Also, the same test is reproduced by changing the associated conditions and environments. In Table 1, all the time is recorded in microseconds.

TABLE 1

Test Results

| Backup source property | Client property | Number of extents | Execution time of algorithm | Times of tests | Predicted elapsed time of backup (PET) | Actual elapsed time of backup (RET) |
|---|---|---|---|---|---|---|
| 1G, iSCSI | OpenStack Ocata, Bare metal | 889 | PT: 974 LRT: 1253 | 3 | 2376404 (prediction is inaccurate due to few learning times, see below lines for refined results) | 1059914 |
| | | 3163 | PT: 3765 LRT: 4650 | 4 | 13630875 | 10293177 |
| | | 2106 | PT: 2431 LRT: 873 | 9 | 2423826 | 2268201 |
| | | 9572 | PT: 11324 LRT: 12938 | 13 | 33415362 | 32372833 |
| 10G, FC VNX | OpenStack Ocata, Bare metal | 17283 (should switch to full backup, namely, the number of extents is 1) | PT: 18988 LRT: 126 | 3 | 55877826 (should switch to full backup, PET of full backup is 43513096) | 40376192 |
| | | 7250 | PT: 8245 LRT: 10701 | 6 | 21751851 | 27487024 |
| | | 3805 | PT: 5771 LRT: 5171 | 7 | 11443478 | 9615301 |

TABLE 1-continued

Test Results

| Backup source property | Client property | Number of extents | Execution time of algorithm | Times of tests | Predicted elapsed time of backup (PET) | Actual elapsed time of backup (RET) |
|---|---|---|---|---|---|---|
| 20G, FC VNX | OpenStack Ocata, | 3861 | PT: 5068 LRT: 4853 | 3 | 11177182 | 9140680 |
| | Bare metal | 36852 | PT: 23103 LRT: 63482 | 7 | 91147841 | 94247323 |
| 1G, iSCSI | OpenStack Newton, | 2400 | PT: 1904 LRT: 8206 | 3 | 5518418 | 6797027 |
| | ESXi Virtual machine | 1200 | PT: 1487 LRT: 3596 | 5 | 2535494 | 2313022 |
| 2G, FC | OpenStack Newton, | 1200 | PT: 2491 LRT: 4626 | 2 | 6182683 | 8212238 |
| | ESXi Virtual machine | 1200 | PT: 1926 LRT: 3497 | 6 | 7326325 | 7751121 |

A large number of extents (the number of extents is 17283) are created specifically with reference to an example of the backup source of 10 G and FC VNX type shown in Table 1 above. The predicted elapsed time of this incremental backup is 55877826. The predicted elapsed time of an equivalent full backup is 43513096, which is shorter than the time of the incremental backup. Thus, it should be switched to the procedure of the full backup whose actual elapsed time is 40376192. Therefore, it can be seen that if an incremental backup contains a huge number of extents, the predicted time of the incremental backup would be longer than the predicted time of an equivalent full backup. Under this condition, the backup proxy 111 is able to switch to the procedure of the equivalent full backup automatically, thereby saving the backup time.

Referring to the case of the first test in Table 1, with more tests, the value of PET is very close to that of RET. It shows that the prediction may become accurate with constantly refined prediction parameters (increasing of test times). Also, with reference to the case of the first test shown in Table 1, for about 10000 extents, both the predicting phase and the learning phase may be completed within 13 milliseconds. It shows that both the prediction algorithm and the learning and refining algorithm may be executed extremely fast. The performance of algorithms of the present disclosure are linearly associated with the number of extents. Furthermore, from Table 1, it can be seen that algorithms of the present disclosure may be adaptive to varying environments (different sizes and types of source storage devices, different OpenStack releases and different host types). By switching to a less time-consuming backup procedure based on prediction, a backup may be optimized. With the prediction technology of a block-level backup of the present disclosure, the performance of an incremental backup for a large number of extents may be improved by 30% to 50%, and the backup task may be scheduled within a limited backup window.

Figure 8:
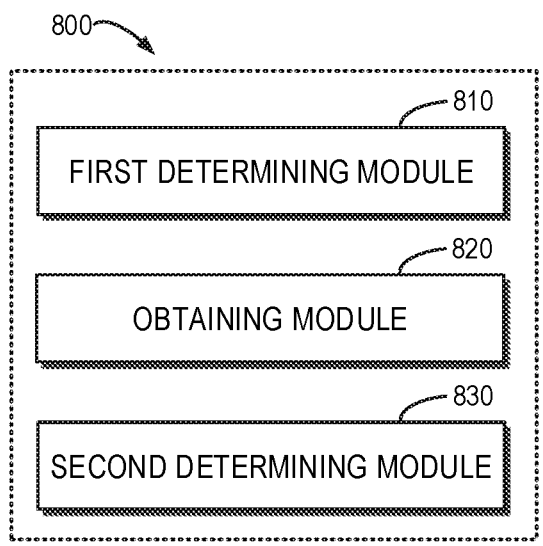
FIG. 8 illustrates a block diagram of an apparatus for managing a data backup in accordance with an embodiment of the present disclosure.

FIG. 8 illustrates a block diagram of an apparatus 800 for managing a data backup in accordance with an embodiment of the present disclosure. In some embodiments, the apparatus 800 can be, for example, implemented at the backup proxy 111. Alternatively, in some embodiments, the apparatus 800 can be implemented as the backup proxy 111 per se directly, namely, the backup proxy 111 can be implemented by the apparatus 800.

As shown in FIG. 8, the apparatus 800 may include a first determining module 810 which is configured to determine a first data amount to be involved in an addressing operation and a second data amount to be involved in a copy operation for an extent to be backed up on a source storage device, the addressing operation addressing a starting address of the extent and the copy operation copying an amount of data corresponding to a length of the extent. The apparatus 800 may further include an obtaining module 820 which is configured to obtain, based on an identifier of the source storage device, a first historical time elapsed for a previous addressing operation having the first data amount and a second historical time elapsed for a previous copy operation having the second data amount. Furthermore, the apparatus 800 may further include a second determining module 830 which is configured to determine a predicted time required for backing up the extent based on the first historical time and the second historical time.

In some embodiments, the extent is selected from a plurality of extents to be backed up that are non-continuous to each other. The apparatus 800 may further include a third determining module which is configured to determine a total predicted time required for backing up the plurality of extents based on the predicted time required for backing up the extent. The apparatus 800 may further include a first performing module which is configured to perform backing up for data on the source storage device based on the total predicted time.

In some embodiments, the first performing module may include a first performing sub-module which is configured to: in response to the total predicted time being shorter than a time required for backing up an entirety of the source storage device, perform the backing up for the plurality of extents, respectively.

In some embodiments, the first performing module may include a second performing sub-module which is configured to: in response to the total predicted time being longer than a time required for backing up an entirety of the source storage device, perform the backing up for an entirety of the source storage device.

In some embodiments, the apparatus 800 may further include a second performing module which is configured to perform the addressing operation and the copy operation. The addressing operation includes addressing to the starting address of the extent and reading the first data amount to a buffer. The copy operation includes appending the read first data amount from the buffer to a stream store and reading and appending the rest of data amount of the extent until a data amount indicated by the length of the extent is finished. The second data amount is equal to the data amount indicated by the length of the extent.

In some embodiments, the apparatus 800 may further include a fourth determining module which is configured to determine a first actual time elapsed for performing the addressing operation. Furthermore, the apparatus 800 may further include a first updating module which is configured to update, based at least in part on the first actual time, the first historical time for a subsequent backup to use.

In some embodiments, the apparatus 800 may further include a fifth determining module which is configured to determine a second actual time elapsed for performing the copy operation. Additionally, the apparatus 800 may further include a second updating module which is configured to update, based at least in part on the second actual time, the second historical time for a subsequent backup to use.

In some embodiments, the first updating module may include a first determining sub-module which is configured to determine a first average time of the first historical time and at least one reference time. The first updating module may further include a first updating sub-module which is configured to update the first historical time based on the first average time, the reference time being a time elapsed for a reference addressing operation having the first data amount.

In some embodiments, the second updating module may include a second determining sub-module which is configured to determine a second average time of the second historical time and at least one reference time. The second updating module may further include a second updating sub-module which is configured to update the second historical time based on the second average time, the reference time being a time elapsed for a reference copy operation having the second data amount.

For the sake of clarity, some optional modules of the apparatus 800 are not shown in FIG. 8. However, it is to be understood that various features as described with reference to FIGS. 1-7 are likewise applicable to the apparatus 800. Furthermore, various modules of the apparatus 800 may be hardware modules or software modules. For example, in some embodiments, the apparatus 800 may be partially or completely implemented using software and/or firmware, e.g., implemented as a computer program product embodied on a computer readable medium. Alternatively or additionally, the apparatus 800 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this regard.

Figure 9:
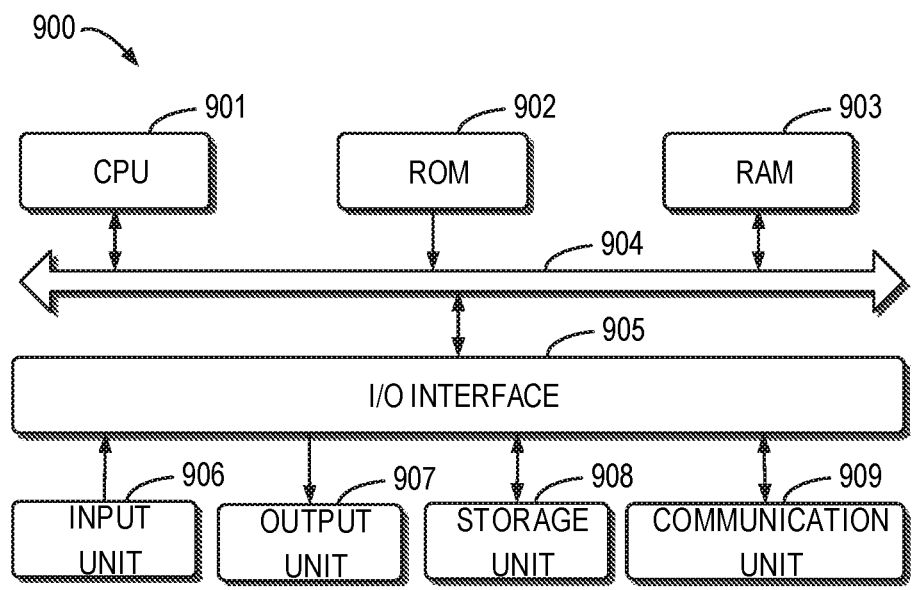
FIG. 9 illustrates a schematic block diagram of an example device that may be used to implement embodiments of the present disclosure.

FIG. 9 illustrates a schematic block diagram of an example device 900 that may be used to implement embodiments of the present disclosure. As shown in FIG. 9, the device 900 includes a central processing unit (CPU) 901, which can perform various appropriate actions and processes based on computer program instructions stored in a read-only memory (ROM) 902 or computer program instructions loaded from a storage unit 908 to a random access memory (RAM) 903. In RAM 903, there are also stored various programs and data required by the device 900 when operating. The CPU 901, ROM 902, and RAM 903 are connected to one another via a bus 904. An input/output (I/O) interface 905 is also connected to the bus 904.

A plurality of components of the device 900 are connected to the I/O interface 905, including: an input unit 906 comprising a keyboard, a mouse, and the like; an output unit 907, such as various types of displays, loudspeakers, and the like; a storage unit 908 including a magnetic disk, an optical disk, and the like; and a communication unit 909 including a LAN card, a modem, a wireless communication transceiver and so on. The communication unit 909 allows the device 900 to exchange information/data with other devices via a computer network, such as the Internet, and/or various telecommunications networks.

The above-described procedures and processes, such as the method 300, can be implemented by the processing unit 901. For example, in some embodiments, the method 300 can be implemented as a computer software program which is tangibly embodied on a machine readable medium, for instance, the storage unit 908. In some embodiments, part or all of the computer program can be loaded to and/or installed on the device 900 via the ROM 902 and/or the communication unit 909. The computer program, when loaded to the RAM 903 and executed by the CPU 901, may execute one or more acts of the method 300 as described above. Alternatively, the CPU 901 can also be configured to implement the method 300 as described above in any other proper manner (for example, by means of firmware).

To sum up, the present disclosure provides a method of predicting a time required for backing up data. By considering the elapsed time of the addressing operation and copy operation for an extent to be backed up, respectively, a time series model is provided. The prediction method based on the time series model provides appropriate tradeoff between prediction accuracy and algorithm complexity. By identifying the source storage device and learning and refining prediction parameters constantly, it is possible to achieve self-adaptation to different disk I/O performances and running environments. With this prediction method, when an incremental backup consumes more time than a full backup, it is possible to switch to the full backup automatically, thereby optimizing the backup.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a data backup, comprising:
    determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent;
    obtaining, based on an identifier of the source storage device, a first historical time elapsed for a previous addressing operation having the first data amount and a second historical time elapsed for a previous copy operation having the second data amount; and
    determining a predicted time required for backing up the extent based on the first historical time and the second historical time.

2. The method according to claim 1,
    wherein the extent is selected from a plurality of extents to be backed up that are non-continuous to each other, the method further comprising:

determining a total predicted time required for backing up the plurality of extents based on the predicted time required for backing up the extent; and backing up data on the source storage device based on the total predicted time.

3. The method according to claim 2, wherein the backing up comprises:

in response to the total predicted time being shorter than a time required for backing up an entirety of the source storage device, backing up the plurality of extents.

4. The method according to claim 2, wherein the backing up comprises:

in response to the total predicted time being longer than a time required for backing up an entirety of the source storage device, performing the backing up for an entirety of the source storage device.

5. The method according to claim 1, further comprising: performing the addressing operation, comprising:
reading the first data amount, from the starting address of the extend, to a buffer; and
performing the copy operation, comprising:
appending the read first data amount from the buffer to a stream store, and
reading and appending the rest of data amount of the extent until a data amount indicated by the length of the extent is finished, the second data amount being equal to the data amount indicated by the length of the extent.

6. The method according to claim 5, further comprising: determining a first actual time elapsed for performing the addressing operation; and
updating, based at least in part on the first actual time, the first historical time for a subsequent backup to use.

7. The method according to claim 5, further comprising: determining a second actual time elapsed for performing the copy operation; and
updating, based at least in part on the second actual time, the second historical time for a subsequent backup to use.

8. The method according to claim 6, wherein the updating comprises:
determining a first average time of the first historical time and at least one reference time; and
updating the first historical time based on the first average time, the reference time being a time elapsed for a reference addressing operation having the first data amount.

9. The method according to claim 7, wherein the updating comprises:
determining a second average time of the second historical time and at least one reference time; and
updating the second historical time based on the second average time, the reference time being a time elapsed for a reference copy operation having the second data amount.

10. An electronic device, comprising:
at least one processing unit; and
at least one memory coupled to the at least one processing unit and storing instructions executable by the at least one processing unit, the instructions, when executed by the at least one processing unit, causing the electronic device to perform acts comprising:
determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent;
obtaining, based on an identifier of the source storage device, a first historical time elapsed for a previous addressing operation having the first data amount and a second historical time elapsed for a previous copy operation having the second data amount; and
determining a predicted time required for backing up the extent based on the first historical time and the second historical time.

11. The electronic device according to claim 10, wherein the extent is selected from a plurality of extents to be backed up that are non-continuous to each other, the instructions, when executed by the at least one processing unit, further cause the electronic device to perform acts comprising:
determining a total predicted time required for backing up the plurality of extents based on the predicted time required for backing up the extent; and
backing up data on the source storage device based on the total predicted time.

12. The electronic device according to claim 11, wherein the backing up comprises:
in response to the total predicted time being shorter than a time required for backing up an entirety of the source storage device, performing the backing up for the plurality of extents.

13. The electronic device according to claim 11, wherein the backing up comprises:
in response to the total predicted time being longer than a time required for backing up an entirety of the source storage device, performing the backing up for an entirety of the source storage device.

14. The electronic device according to claim 10, wherein the instructions, when executed by the at least one processing unit, further cause the electronic device to perform acts comprising:
performing the addressing operation, comprising:
reading the first data amount, from the starting address of the extend, to a buffer; and
performing the copy operation, comprising:
appending the read first data amount from the buffer to a stream store, and
reading and appending the rest of data amount of the extent until a data amount indicated by the length of the extent is finished, the second data amount being equal to the data amount indicated by the length of the extent.

15. The electronic device according to claim 14, wherein the instructions, when executed by the at least one processing unit, further cause the electronic device to perform acts comprising:
determining a first actual time elapsed for performing the addressing operation; and
updating, based at least in part on the first actual time, the first historical time for a subsequent backup to use.

16. The electronic device according to claim 14, wherein the instructions, when executed by the at least one processing unit, further cause the electronic device to perform acts comprising:
determining a second actual time elapsed for performing the copy operation; and
updating, based at least in part on the second actual time, the second historical time for a subsequent backup to use.

17. The electronic device according to claim 15, wherein the updating comprises:

determining a first average time of the first historical time and at least one reference time; and updating the first historical time based on the first average time, the reference time being a time elapsed for a reference addressing operation having the first data amount.

18. The electronic device according to claim 16, wherein the updating comprises:

determining a second average time of the second historical time and at least one reference time; and updating the second historical time based on the second average time, the reference time being a time elapsed for a reference copy operation having the second data amount.

19. A computer program product being tangibly stored on a non-transient computer readable medium and comprising machine executable instructions which, when executed, causing a machine to perform the steps of a method, the method comprising:

determining a first data amount to be involved in an addressing operation and a second data amount to be involved in a copy operation for an extent to be backed up on a source storage device, the addressing operation addressing a starting address of the extent and the copy operation copying an amount of data corresponding to a length of the extent;

obtaining, based on an identifier of the source storage device, a first historical time elapsed for a previous addressing operation having the first data amount and a second historical time elapsed for a previous copy operation having the second data amount; and determining a predicted time required for backing up the extent based on the first historical time and the second historical time.

20. The computer program product of claim 19, wherein the extent is selected from a plurality of extents to be backed up that are non-continuous to each other and wherein the method further comprises:

determining a total predicted time required for backing up the plurality of extents based on the predicted time required for backing up the extent; and backing up data on the source storage device based on the total predicted time.

* * * * *